US011678151B2

(12) United States Patent
Krome et al.

(10) Patent No.: US 11,678,151 B2
(45) Date of Patent: Jun. 13, 2023

(54) METHOD AND SYSTEM FOR DISPLAYING A MAP TO GUIDE A USER IN A VENUE

(71) Applicant: HERE Global B.V., Eindhoven (NL)

(72) Inventors: Sven Krome, Berlin (DE); Theresa Breunig, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 462 days.

(21) Appl. No.: 16/023,544

(22) Filed: Jun. 29, 2018

(65) Prior Publication Data

US 2020/0008022 A1 Jan. 2, 2020

(51) Int. Cl.
*H04W 4/33* (2018.01)
*H04W 4/024* (2018.01)
*G01C 21/20* (2006.01)

(52) U.S. Cl.
CPC ............ *H04W 4/33* (2018.02); *G01C 21/206* (2013.01); *H04W 4/024* (2018.02)

(58) Field of Classification Search
CPC ....... H04W 4/33; H04W 4/024; G01C 21/206
USPC ..................................................... 455/456.1
See application file for complete search history.

(56) References Cited

U.S. PATENT DOCUMENTS

| 6,002,853 | A | 12/1999 | de Hond |
| 6,091,417 | A | 7/2000 | Lefkowitz |
| 7,756,722 | B2 | 7/2010 | Levine et al. |
| 8,924,185 | B2 | 12/2014 | Moreau et al. |
| 2015/0286324 | A1* | 10/2015 | Suzuki ................. G01C 21/206 345/581 |
| 2017/0045361 | A1* | 2/2017 | Javed .................... G01C 21/206 |
| 2017/0122744 | A1* | 5/2017 | Long ..................... G01C 21/005 |

OTHER PUBLICATIONS

Poole, S et al., "Simple Indoor Tagging" [online] [retrieved Jul. 17, 2018], Retrieved from Internet: <URL:https://wiki.openstreetmap.org/wiki.Simple_Indoor_Tagging (dated May 11, 2018).

\* cited by examiner

*Primary Examiner* — Huy C Ho
(74) *Attorney, Agent, or Firm* — Alston & Bird LLP

(57) ABSTRACT

A method, system, and computer program product for displaying a map to guide a user in a venue is provided. The method comprises generating a first view comprising a map of at least one floor of the venue with one or more cartographic elements representing positions of one or more floor connectors in the at least one floor. The method further comprises causing display of the first view on a display unit of a user device. The method further comprises receiving a user selection of one of the one or more cartographic elements via the display unit. The method further comprises generating a second view comprising at least one graphic element to indicate one or more possible directions of movement via the floor connector. The method further comprises causing display of the second view on the display unit of the user device.

16 Claims, 18 Drawing Sheets

METHOD AND SYSTEM FOR DISPLAYING A MAP TO GUIDE A USER IN A VENUE

TECHNOLOGICAL FIELD

The present disclosure generally relates to a system and method for indoor map navigation for a user, and more particularly relates to a system and method for displaying a map of a floor in a multi-floor venue with interactive display of floor connectors.

BACKGROUND

Navigating within large venues, e.g., shopping malls, hospitals, office buildings, public buildings (museums, city halls, conference centers, etc.), covered parking lots, etc. is difficult. Structures and buildings such as these can be very complex, for example, with multiple entrances, multiple floors, multiple sections, wings, and in the case of malls, an abundance of shops. Displaying maps of such indoor spaces takes a vast amount of display screen area due to the large number of objects to be shown in such maps. However, supporting such features is not compatible with the customer requirements for a "small size device." Therefore, the designers of maps have to either limit their designs to display screens capable of displaying a smaller amount of information or to enlarge the size of the display, neither of which may satisfy all customer requirements.

For indoor navigation, maps are often stored in Geography Markup Language (GML), a vector XML format encoding standard for geographic information developed by the OpenGIS Consortium (OGC). Currently most of GML maps (e.g. Destination Maps XML, by NAVTEQ® GML), have only a single level of the geometry of the venue (a flat structure), such as the polygon description of destinations or Points of Interest (POIs). For instance, in current maps of venues, floor connectors which connects one floor to one or more other floors in a multi-floor venue are generally represented by static elements. The floor connectors are one of the most crucial element within indoor maps as they represent connections between various floors in the venue.

In particular, these floor connectors are displayed as abstracted map elements or POI icons without representing a relationship between the starting point and end point of the floor connector, and/or or direction of movement therefrom. Further, these static elements do not provide any information about connected floor(s) nor possibility to switch the current floor being displayed therefrom. For example, a floor connector, like an escalator, may be represented by a static icon display, for example, static polygon shape to loosely indicate geometry of the floor connector. As a consequence, the user can't understand which other floors are connected to the floor being displayed on the map, and where the floor connector leads them. Thus, it becomes difficult for users to navigate within the venue replying only on such maps as the static representations does not help the user to gain a mental model of the three-dimensional space of the floor in the venue.

BRIEF SUMMARY

In light of the above discussed problems, there is a need to provide better indoor navigation techniques for multi-floor venues, and particularly to provide better techniques for displaying a map to guide a user through multiple floor connectors in a multi-floor venue. Ideally, a user device needs to retrieve a maximum amount of information, display the information on a limited amount of display space, and in the shortest period of time. Such constraints can benefit from an improved system or an improved method for searching and presenting the information to the user. In contrast to static display of floor connectors in the prior solutions, the present disclosure enables the users to navigate the venue map by interacting with the floor connectors. The present disclosure provides intuitive animations and interaction models for various types of possible floor connectors in order to help the user to gain a mental model of the three-dimensional space of the floor in the venue In one aspect, a computer-implemented method for displaying a map to guide a user in a venue is provided. The method comprises generating a first view. The first view comprises a map of at least one floor of the venue with one or more cartographic elements representing positions of one or more floor connectors in the at least one floor. Each of the one or more floor connectors connects the at least one floor to one or more other floors in the venue. The method further comprises causing display of the first view on a display unit of a user device. The method further comprises receiving, during the display of the first view, a user selection of one of the one or more cartographic elements via the display unit. The method further comprises generating, in response to receiving the user selection, a second view. The second view comprises at least one graphic element to indicate one or more possible directions of movement via the floor connector, corresponding to the user selection of the cartographic element, from the at least one floor to the one or more other floors in the venue. The method further comprises causing display of the second view on the display unit of the user device.

In one or more embodiments, the first view further comprises one or more direction arrows arranged next to each of the one or more cartographic elements. The one or more direction arrows indicate positions of the one or more other floors, connected via the one or more floor connectors corresponding to each of the one or more cartographic elements, with respect to the at least one floor.

In one or more embodiments, the second view further comprises a numeral element arranged next to the graphic element. The numeral element indicates a relative level of the other floor, connected via the floor connector corresponding to the graphic element, with respect to the at least one floor.

In one or more embodiments, the method also comprises receiving a user selection of the numeral element on the display unit. The method further comprises generating, in response to the user selection of the numeral element, a third view. The third view comprises a map of the other floor connected to the at least one floor via the floor connector corresponding to the numeral element. The method further comprises causing display of the third view on the display unit of the user device.

In one or more embodiments, the graphic element depicts a path to be traversed by the user for reaching the one or more other floors from the at least one floor via the floor connector corresponding to the graphic element.

In one or more embodiments, the graphic element includes guiding arrows overlaid on the depicted path to indicate direction of movement to be followed for reaching the one or more other floors from the at least one floor via the floor connector corresponding to the graphic element.

In one or more embodiments, the graphic element is in the form of a bar listing the one or more other floors connected to the at least one floor via the floor connector corresponding to the graphic element.

In one or more embodiments, the method further comprises causing display of a transition effect while causing switching of the display from the first view to the second view on the display unit of the user device.

In one or more embodiments, the at least one floor is one of the floors in the venue where the user is currently located, and wherein the at least one floor is automatically determined by using one or more sensors in the user device.

In one or more embodiments, the cartographic elements implement different icons for different types of floor connectors.

In one or more embodiments, the graphic elements have different shapes based, at least in part, on the corresponding cartographic elements.

In one or more embodiments, the method further comprises restoring back to the first view from the second view upon receiving, during the display of the second view, a user interaction on the display unit.

In one or more embodiments, the method further comprises restoring back to the first view from the second view after expiry of a predetermined period of time.

In another aspect, a system for displaying a map to guide a user in a venue is provided. The system comprises a user device with a display unit, wherein the display unit is configured to receive a user selection. The system also comprises at least one processor and at least one non-transitory memory comprising computer program code instructions. The computer program code instructions configured to, when executed, cause the at least one processor to: generate a first view, the first view comprising a map of at least one floor of the venue with one or more cartographic elements representing positions of one or more floor connectors in the at least one floor, wherein each of the one or more floor connectors connects the at least one floor to one or more other floors in the venue; cause display of the first view on the display unit of the user device; receive, during the display of the first view, a user selection of one of the one or more cartographic elements via the display unit; generate, in response to receiving the user selection, a second view, the second view comprising at least one graphic element to indicate one or more possible directions of movement via the floor connector, corresponding to the user selection of the cartographic element, from the at least one floor to the one or more other floors in the venue; and cause display of the second view on the display unit of the user device.

In one or more embodiments, the first view further comprises one or more direction arrows arranged next to each of the one or more cartographic elements. The one or more direction arrows indicate positions of the one or more other floors, connected via the one or more floor connectors corresponding to each of the one or more cartographic elements, with respect to the at least one floor.

In one or more embodiments, the second view further comprises a numeral element arranged next to the graphic element. The numeral element indicates a relative level of the other floor, connected via the floor connector corresponding to the graphic element, with respect to the at least one floor.

In one or more embodiments, the system further comprises receiving a user selection of the numeral element on the display unit. The method further comprises generating, in response to the user selection of the numeral element, a third view. The third view comprises a map of the other floor connected to the at least one floor via the floor connector corresponding to the numeral element. The method further comprises causing display of the third view on the display unit of the user device.

In one or more embodiments, the graphic element depicts a path to be traversed by the user for reaching the one or more other floors from the at least one floor via the floor connector corresponding to the graphic element.

In one or more embodiments, the graphic element includes guiding arrows overlaid on the depicted path to indicate direction of movement to be followed for reaching the one or more other floors from the at least one floor via the floor connector corresponding to the graphic element.

In one or more embodiments, the graphic element is in the form of a bar listing the one or more other floors connected to the at least one floor via the floor connector corresponding to the graphic element.

In one or more embodiments, the system further comprises causing display of a transition effect while causing switching of the display from the first view to the second view on the display unit of the user device.

In one or more embodiments, the at least one floor is one of the floors in the venue where the user is currently located, and wherein the at least one floor is automatically determined by using one or more sensors in the user device.

In one or more embodiments, the cartographic elements implement different icons for different types of floor connectors.

In one or more embodiments, the graphic elements have different shapes based, at least in part, on the corresponding cartographic elements.

In one or more embodiments, the system further comprises restoring back to the first view from the second view upon receiving, during the display of the second view, a user interaction on the display unit.

In one or more embodiments, the system further comprises restoring back to the first view from the second view after expiry of a predetermined period of time.

In yet another aspect, a computer program product is provided. The computer program product comprises at least one non-transitory computer-readable storage medium having computer-executable program code instructions stored therein. The computer-executable program code instructions comprising program code instructions to: generate a first view, the first view comprising a map of at least one floor of the venue with one or more cartographic elements representing positions of one or more floor connectors in the at least one floor, wherein each of the one or more floor connectors connects the at least one floor to one or more other floors in the venue; cause display of the first view on the display unit of the user device; receive, during the display of the first view, a user selection of one of the one or more cartographic elements via the display unit; generate, in response to receiving the user selection, a second view, the second view comprising at least one graphic element to indicate one or more possible directions of movement via the floor connector, corresponding to the user selection of the cartographic element, from the at least one floor to the one or more other floors in the venue; and cause display of the second view on the display unit of the user device.

In one or more embodiments, the first view further comprises one or more direction arrows arranged next to each of the one or more cartographic elements, the one or more direction arrows indicating positions of the one or more other floors, connected via the one or more floor connectors corresponding to each of the one or more cartographic elements, with respect to the at least one floor.

In one or more embodiments, the second view further comprises a numeral element arranged next to the graphic element, the numeral element indicating a relative level of the other floor, connected via the floor connector corresponding to the graphic element, with respect to the at least one floor.

In one or more embodiments, the computer program product further comprises program code instructions to receive a user selection of the numeral element on the display unit; generate, in response to the user selection of the numeral element, a third view, the third view comprising a map of the other floor connected to the at least one floor via the floor connector corresponding to the numeral element; and cause display of the third view on the display unit of the user device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
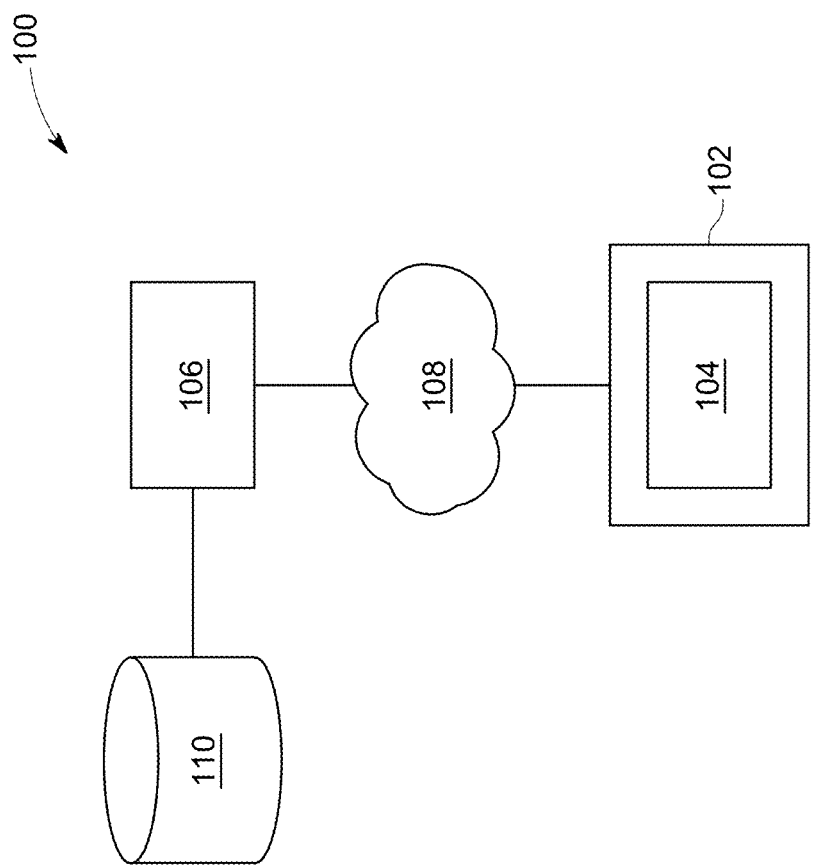
Figure 2:
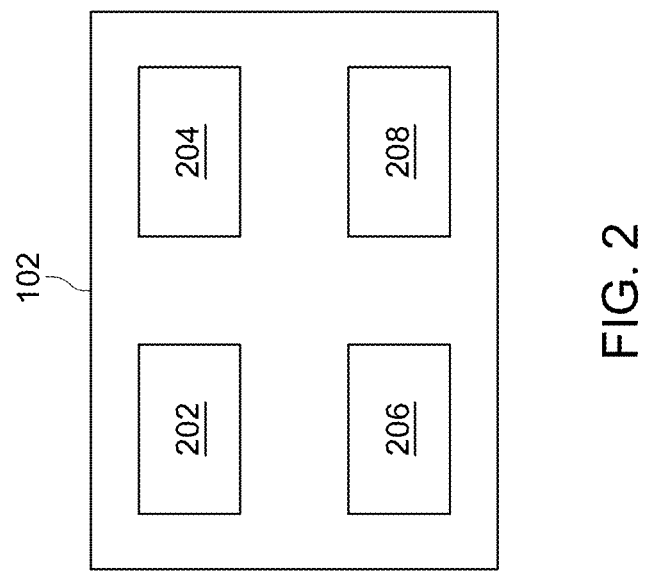
Figure 3:
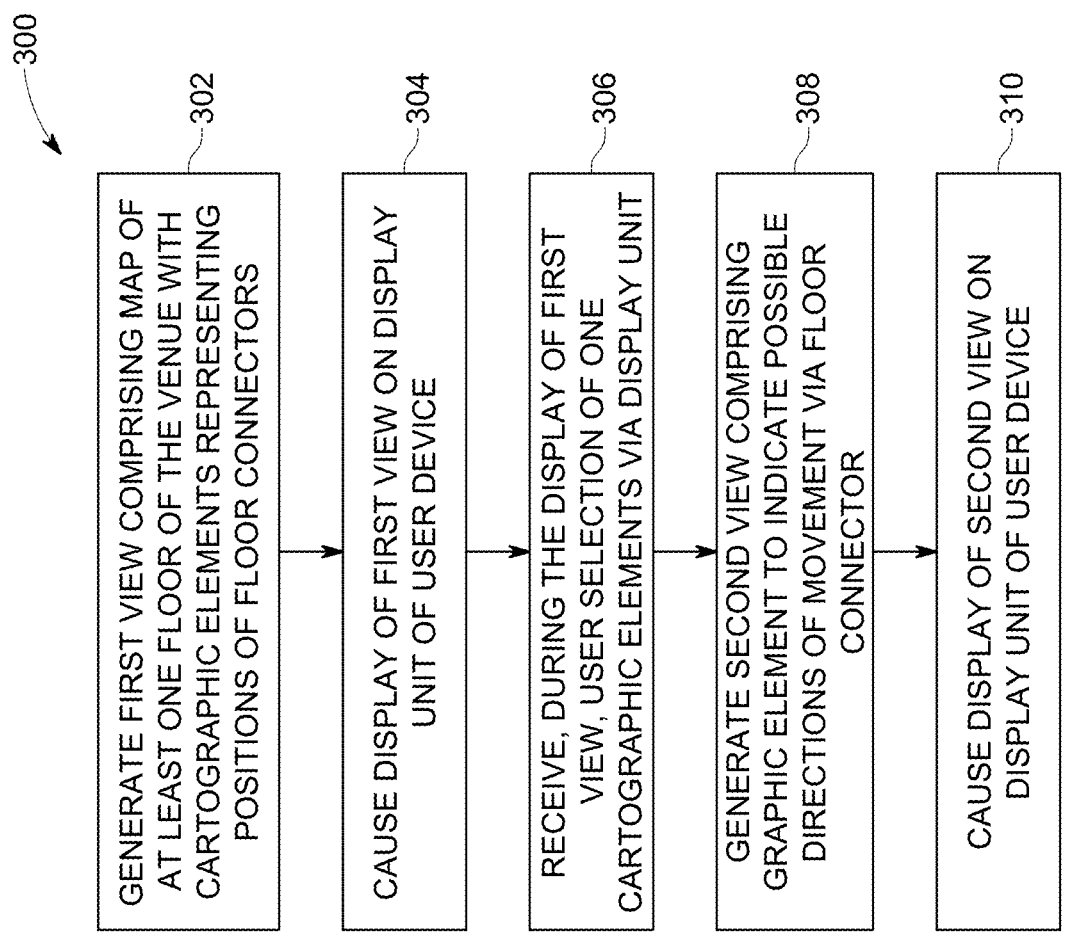
Figure 4:
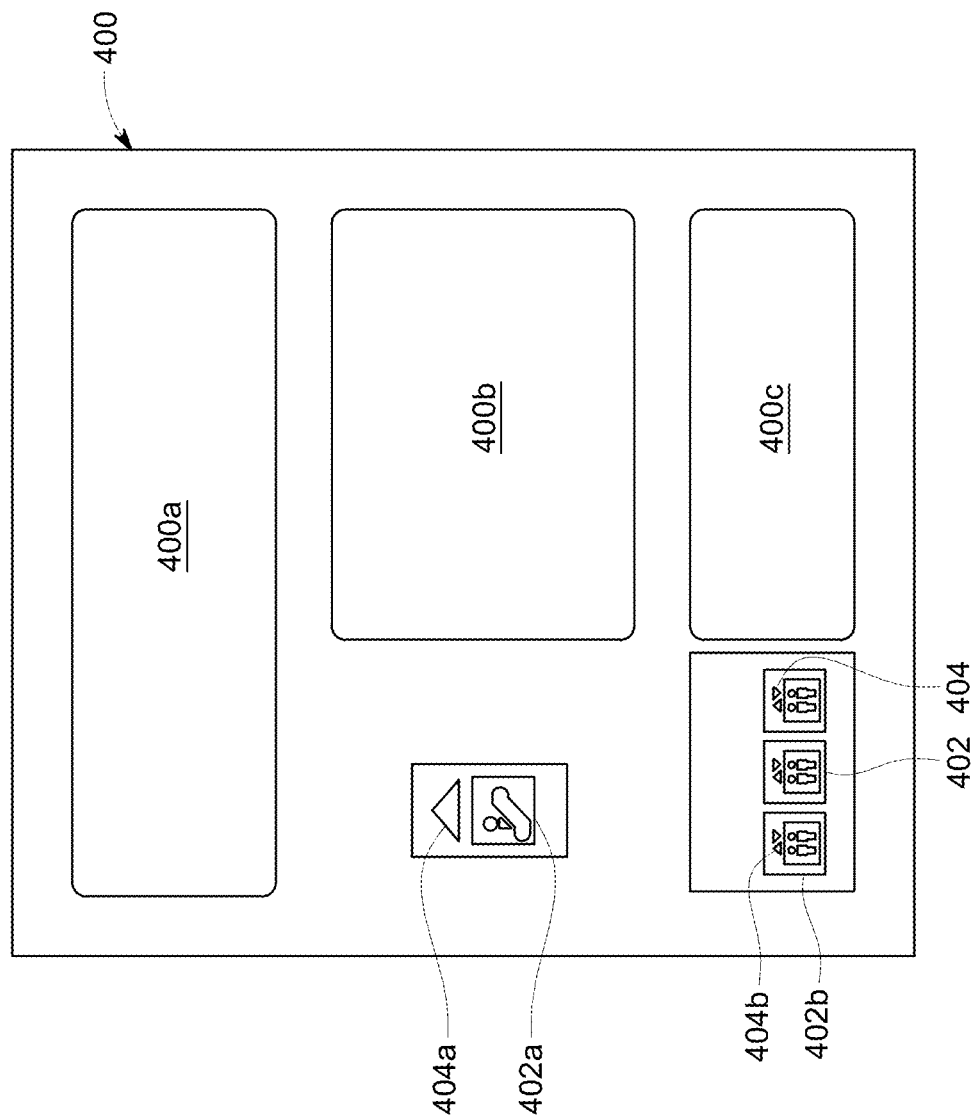
Figure 5:
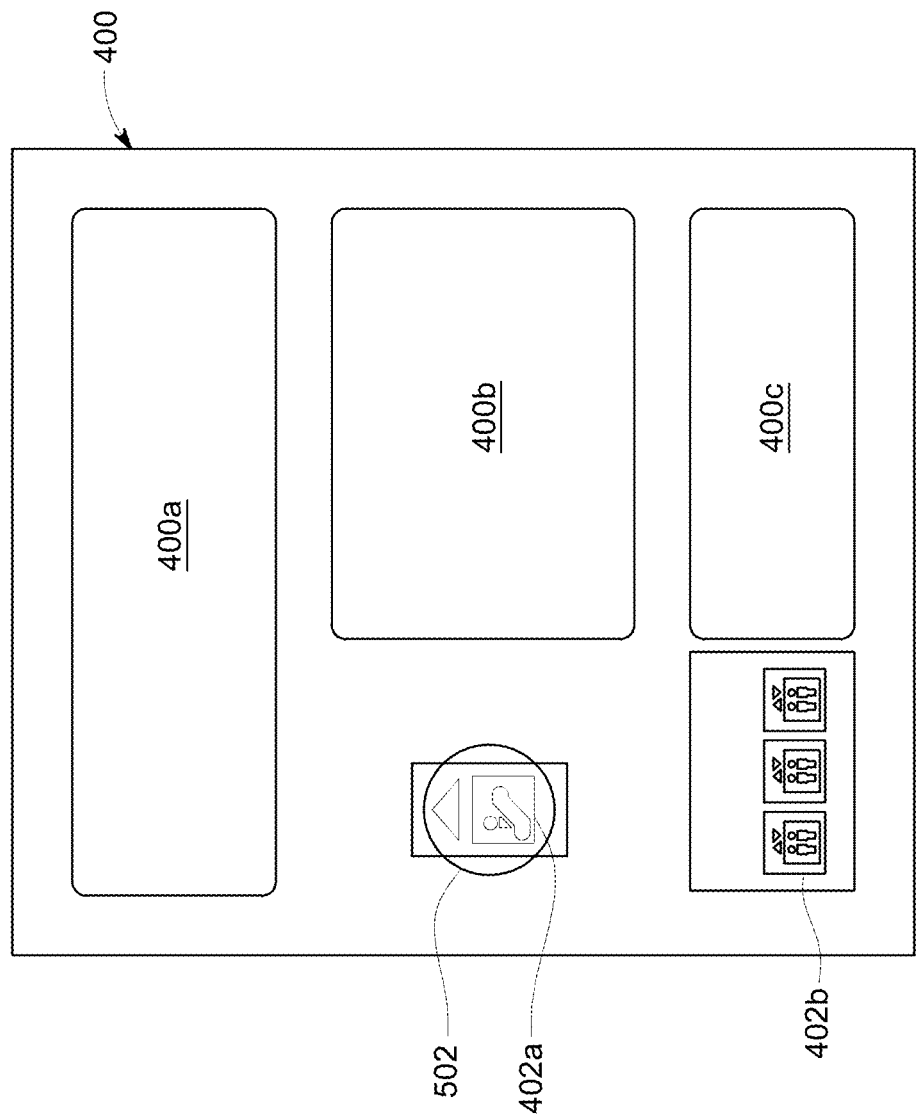
Figure 6:
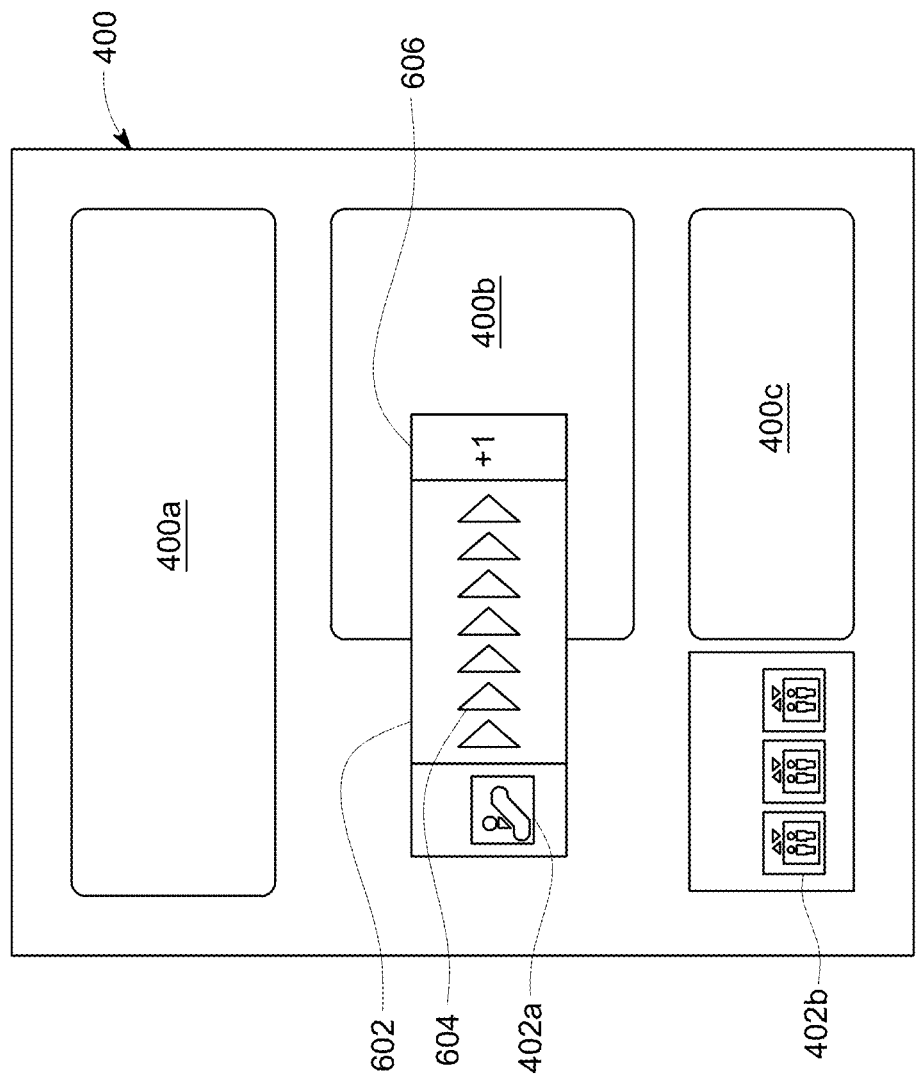
Figure 7:
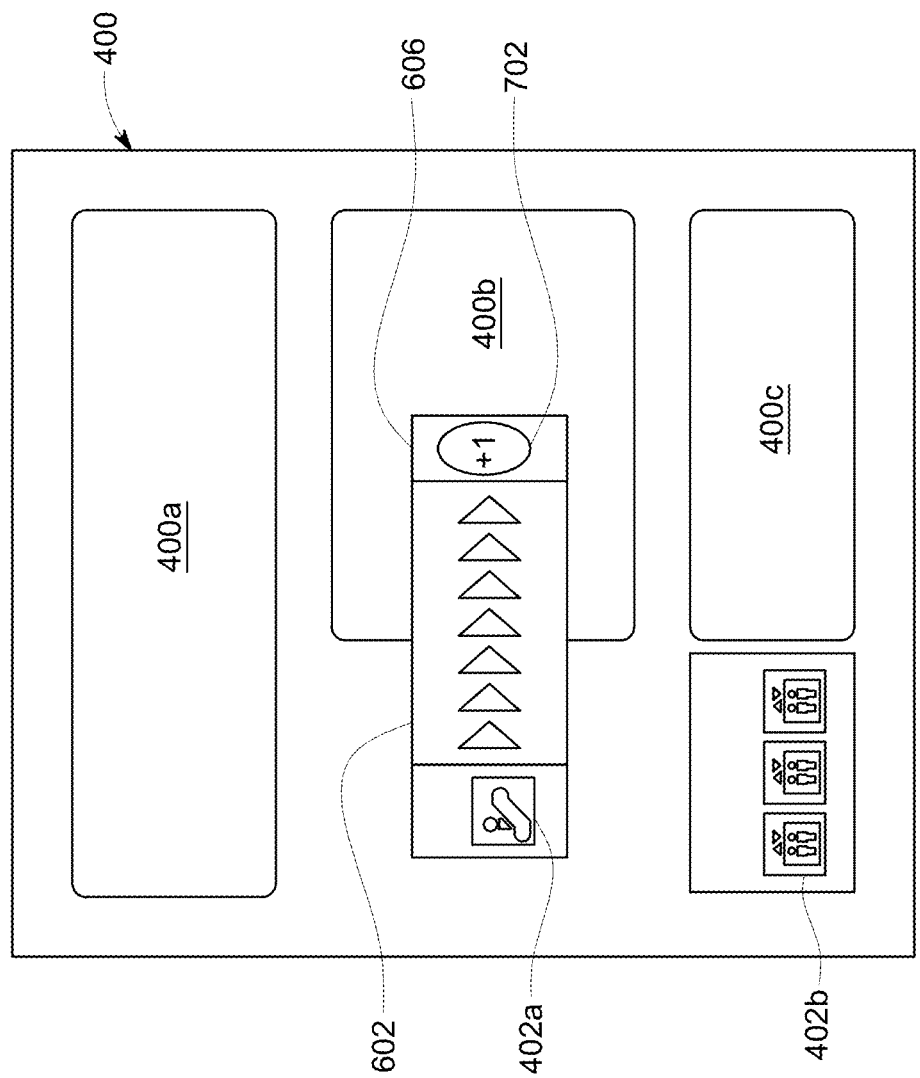
Figure 8:
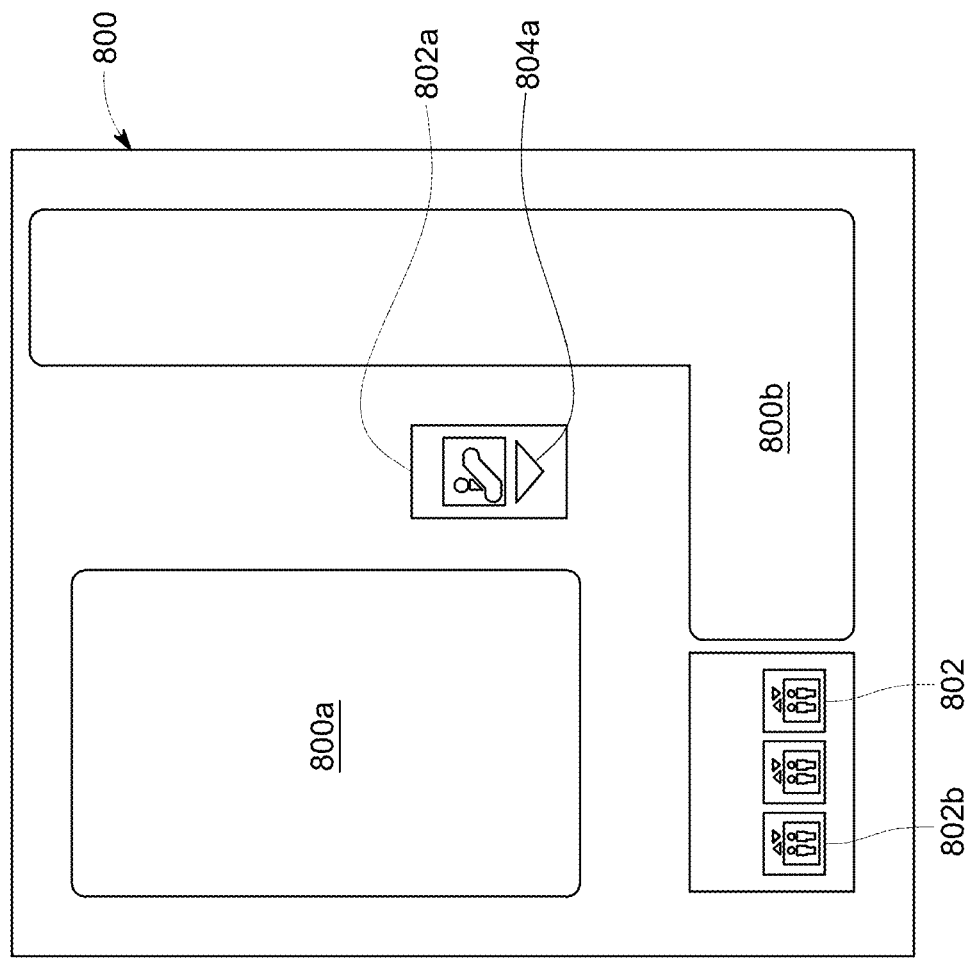
Figure 9:
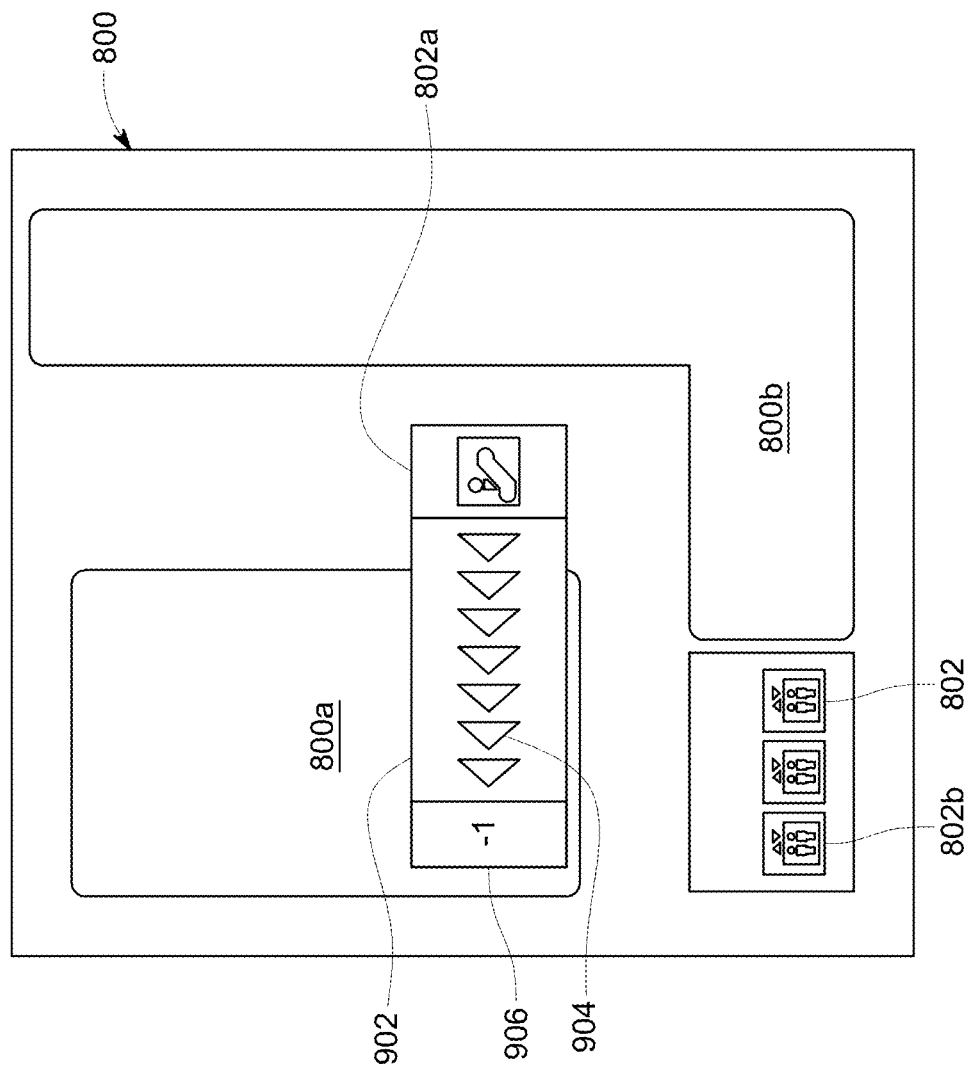
Figure 10:
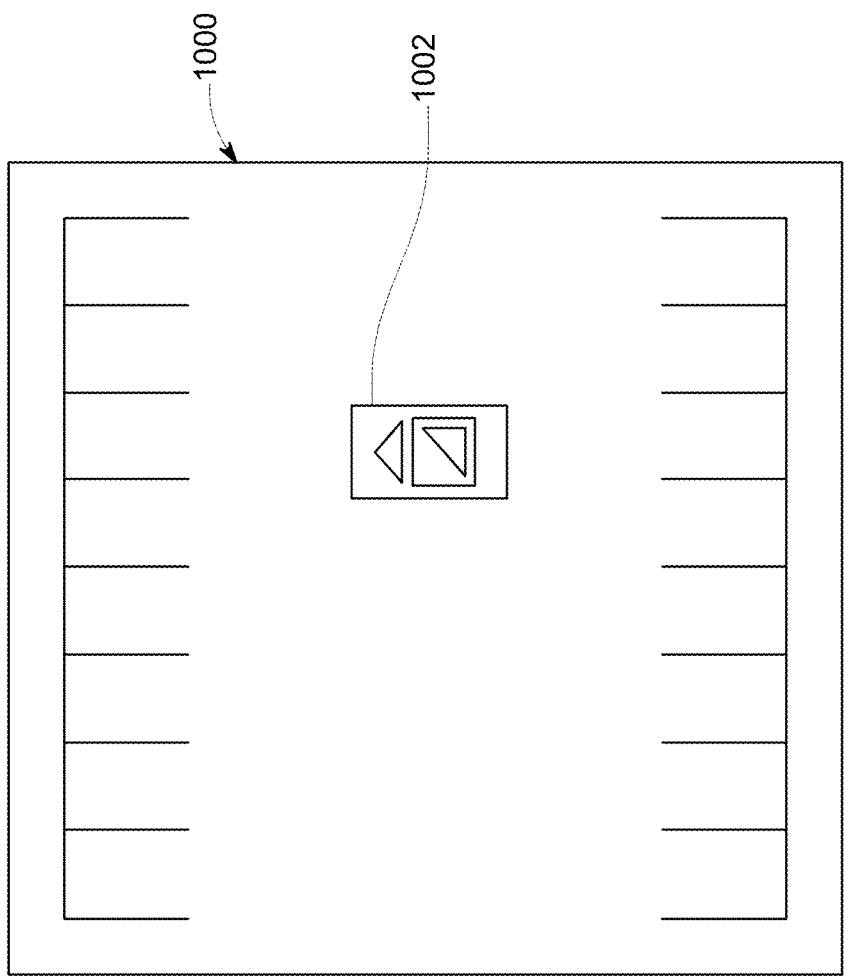
Figure 11:
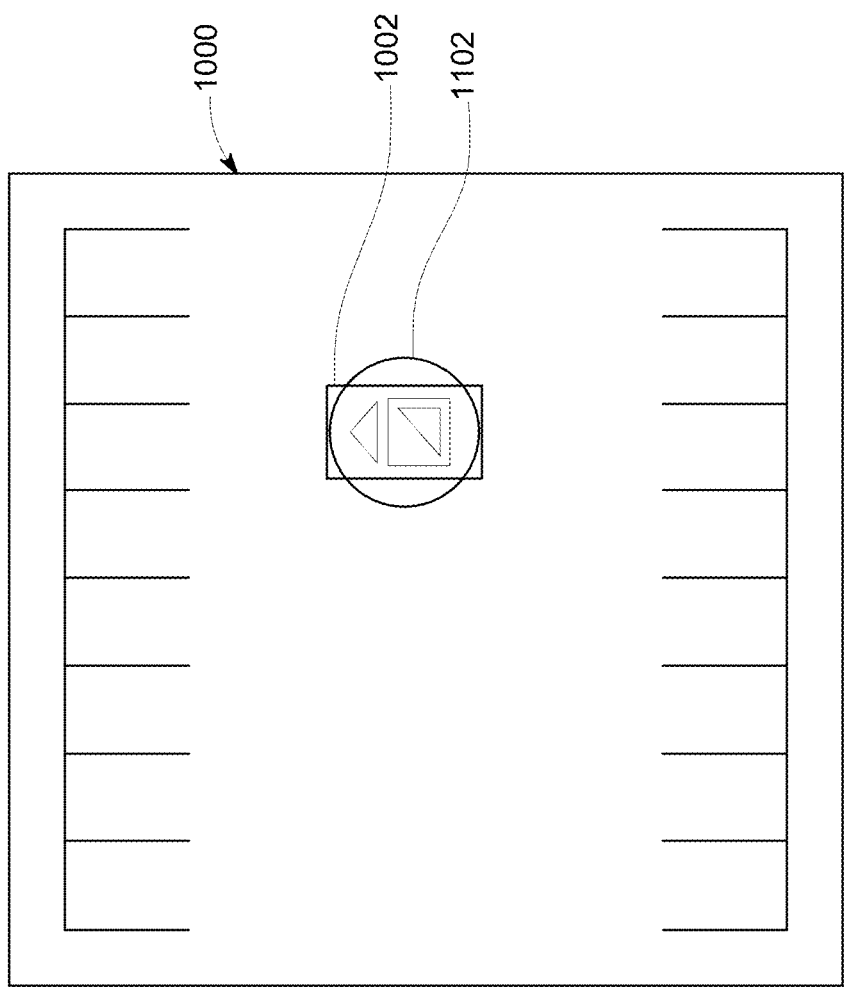
Figure 12:
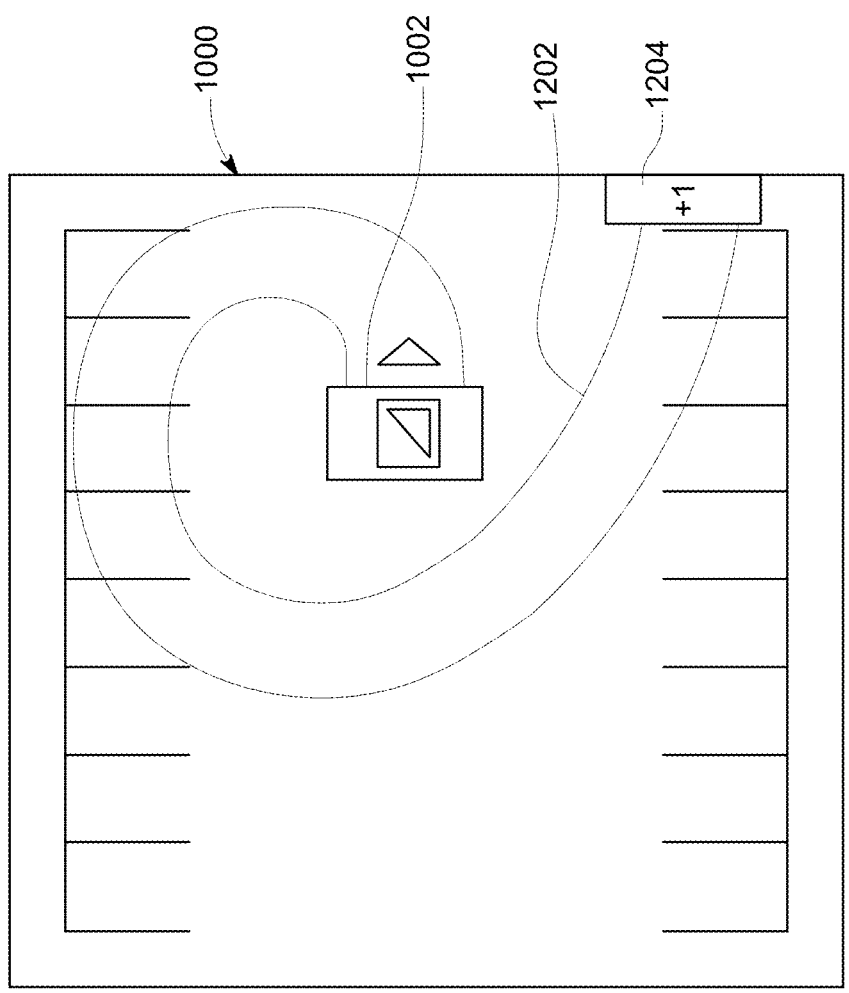
Figure 13:
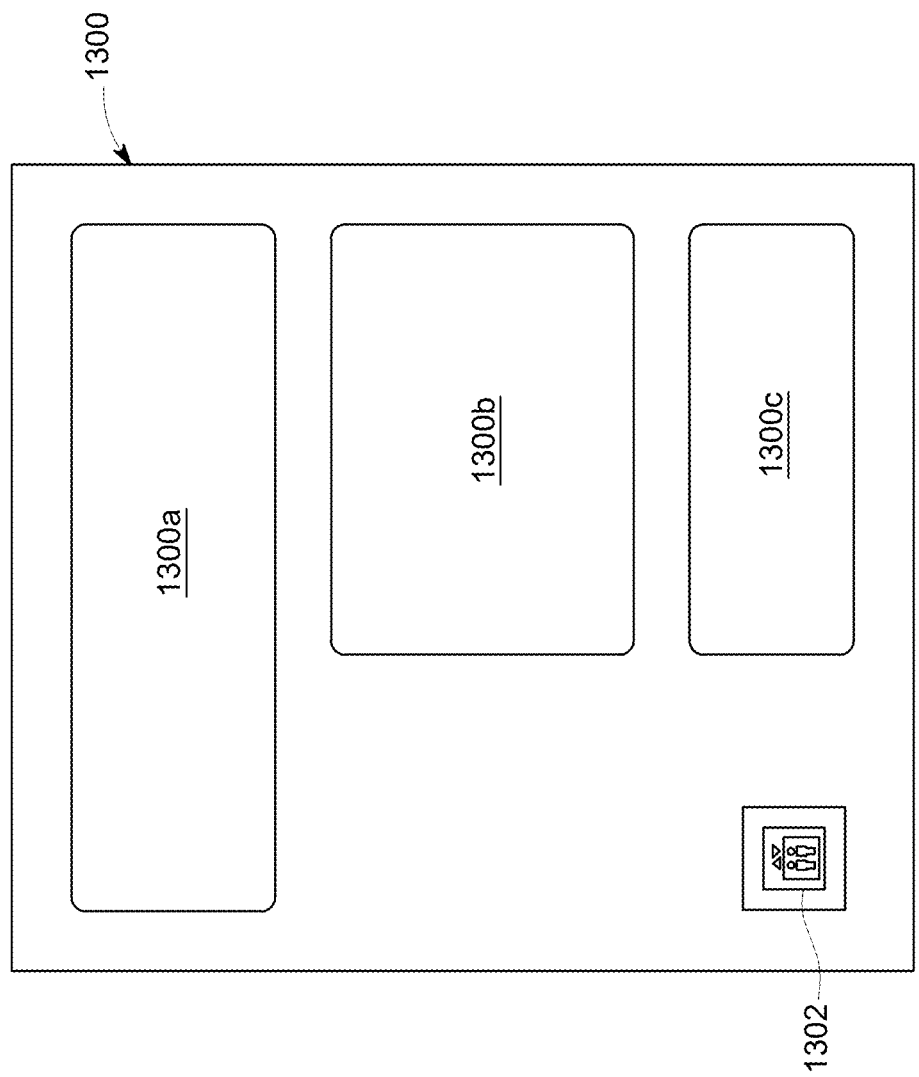
Figure 14:
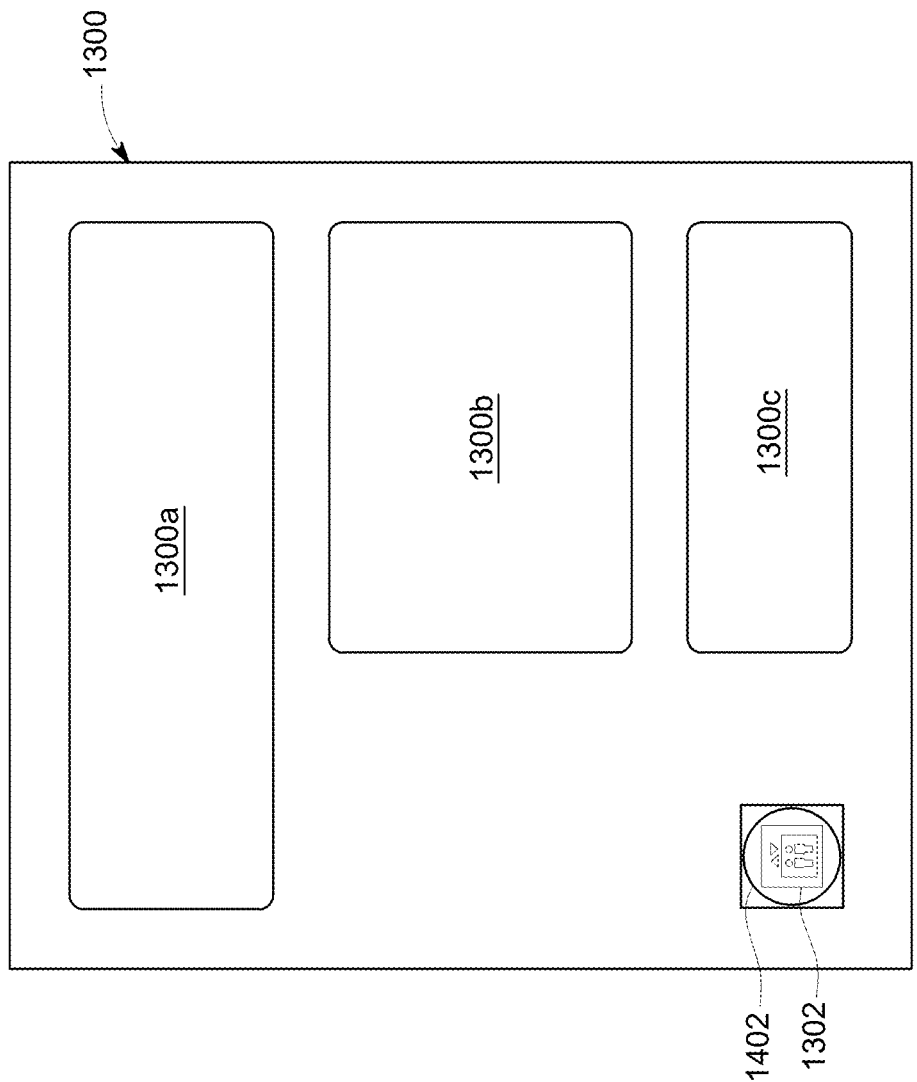
Figure 15:
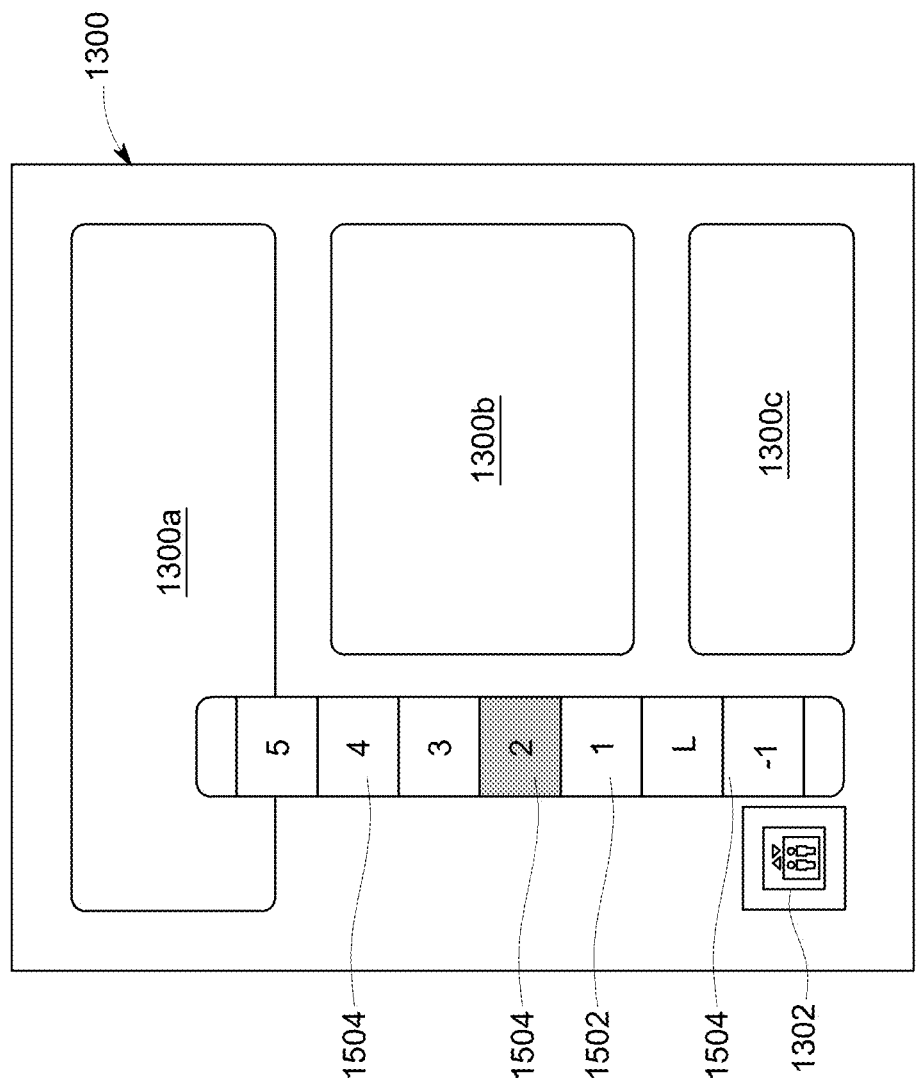
Figure 16:
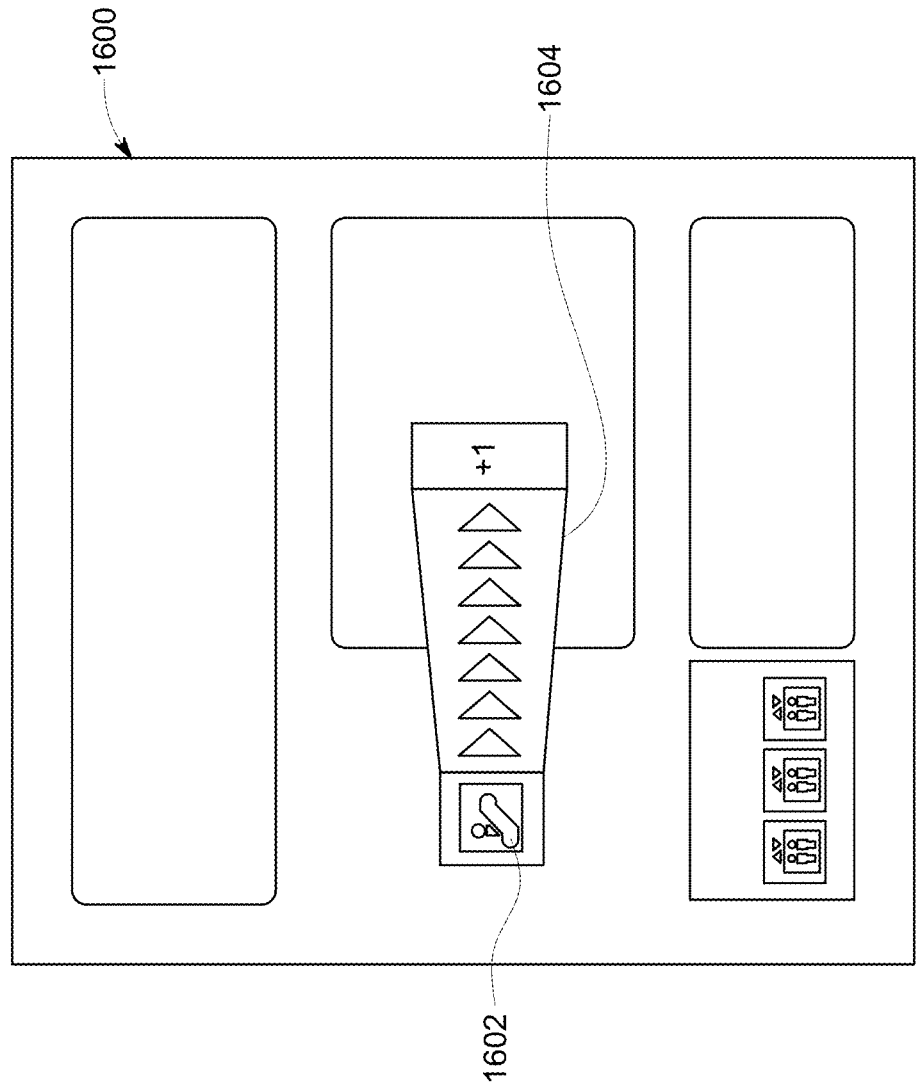
Figure 17:
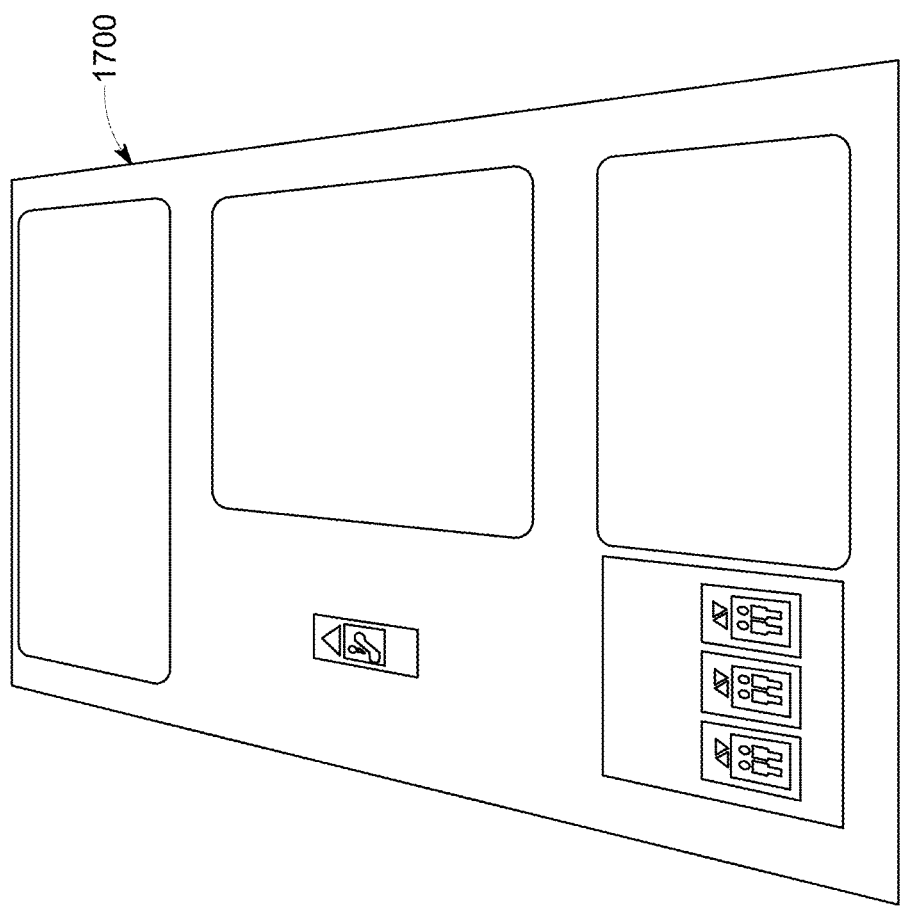
Figure 18:
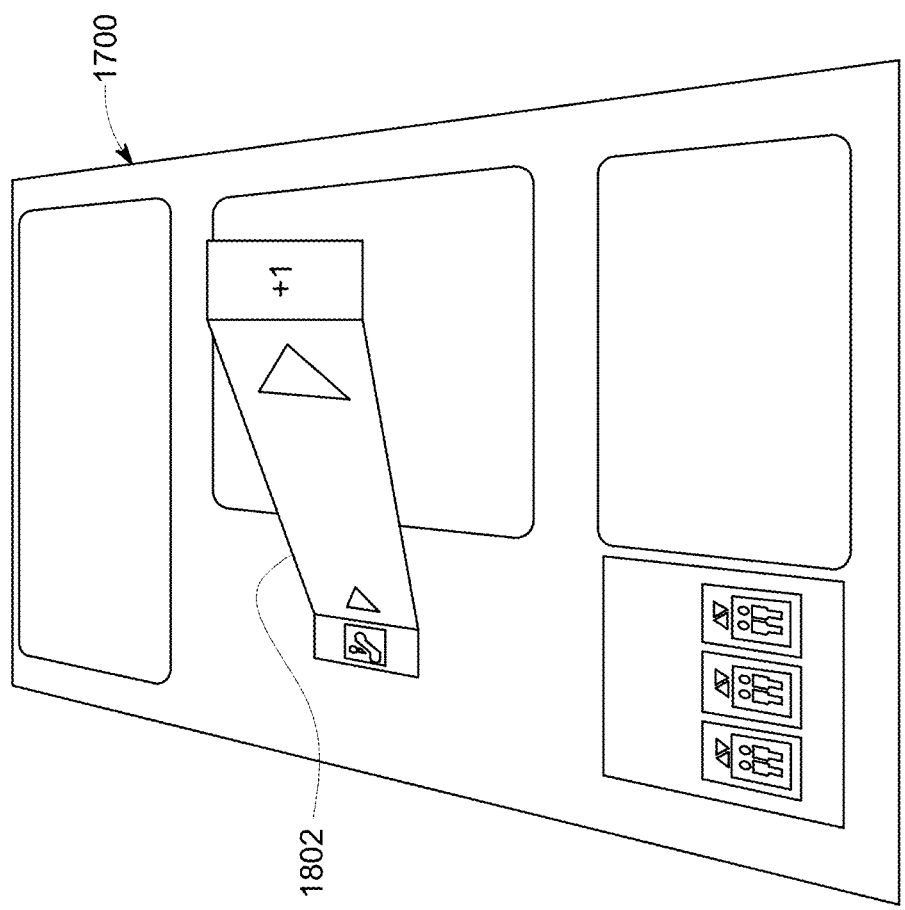

Having thus described example embodiments of the invention in general terms, reference will now be made to the accompanying drawings, which are not necessarily drawn to scale, and wherein:

FIG. 1 illustrates a schematic block diagram of a system for presenting a map of a floor in a multi-floor venue, in accordance with an example embodiment;

FIG. 2 illustrates a block diagram of a user device for displaying a map of a floor in a multi-floor venue to a user, in accordance with an example embodiment;

FIG. 3 illustrates a flowchart depicting a method for generating and displaying a map of a floor in a multi-floor venue for a user, in accordance with an example embodiment;

FIG. 4 depicts a first view of a map of at least one floor of the venue, in accordance with an example embodiment;

FIG. 5 depicts a user selection of a cartographic element in the first view of the map of the at least one floor of the venue, in accordance with an example embodiment;

FIG. 6 depicts a second view of a map of the at least one floor of the venue, in accordance with an example embodiment;

FIG. 7 depicts a user selection of a numeral element in the second view of the map of the at least one floor of the venue, in accordance with an example embodiment;

FIG. 8 depicts a third view of a map of other floor connected to the at least one floor via a floor connector corresponding to the numeral element, in accordance with an example embodiment;

FIG. 9 depicts a user selection of a cartographic element in the third view of the map of the other floor of the venue, in accordance with an example embodiment;

FIG. 10 depicts a first view of a map of a floor in the venue with a cartographic element representing a ramp as a floor connector, in accordance with an example embodiment;

FIG. 11 depicts a user selection of the cartographic element in the first view of the map of FIG. 10, in accordance with an example embodiment;

FIG. 12 depicts a second view of the map of FIG. 10 with a graphical element, in accordance with an example embodiment;

FIG. 13 depicts a first view of a map of a floor in the venue with a cartographic element representing an elevator as a floor connector, in accordance with an example embodiment;

FIG. 14 depicts a user selection of the cartographic element in the first view of the map of FIG. 13, in accordance with an example embodiment;

FIG. 15 depicts a second view of the map of FIG. 13 with a graphical element, in accordance with an example embodiment;

FIG. 16 depicts a second view of a map of one of the floors of the venue with a cartographic element and corresponding graphic element, in accordance with an example embodiment;

FIG. 17 depicts a first view of a map of one of the floors of the venue with a cartographic element, in accordance with an example embodiment; and FIG. 18 depicts a second view of a map of one of the floors of the venue with a cartographic element and corresponding graphic element, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

FIG. 1 illustrates an exemplary block diagram of a system (generally referred by the numeral 100) employable for presenting a map of a floor in a multi-floor venue for a user. The system 100 includes one or more user devices 102, each of which may include or be communicatively coupled with a display unit 104 for displaying a map to a user of the user device 102. In various examples, the user devices 102 may include, but are not limited to, smart phones, tablet computers, personal digital assistants (PDAs), desktop computers, laptop computers, gaming devices, and the like. In other examples, the user devices 102 may be special-purpose electronic devices or systems that may be available at a kiosk or similar system accessible to the public. The display unit 104 may be a liquid crystal display (LCD) panel, a video monitor, a television, or any other visual display device capable of displaying a map and other graphical representations to a user that are described herein. In one example, the display unit 104 is capable of receiving a user selection of one or more graphical representations being displayed thereon. For this purpose, the display unit 104 may be a touchscreen display. Alternatively, the user device 102 may include control buttons to select one or more graphical representations on the display unit 104.

The user devices 102 may be communicatively coupled to a mapping server 106 or similar system via a communication network 108. The communication network 108 may include any one or more networks or communication connections, such as, for example, a local area network (LAN) (e.g., Ethernet or Wi-Fi®), a wide area network (WAN) (e.g., the Internet), a cellular network (e.g., third-generation (3G) or fourth-generation (4G) network), a Bluetooth® connection, or another communication network or connection. The communication network 108 may implement any communication standards, such as, but not limited to, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network may implement a radio technology such as Universal Terrestrial Radio Access (UTRA), CDMA2000, etc. UTRA includes Wideband CDMA (W-CDMA). CDMA2000 covers IS-2000, IS-95 and technology such as Global System for Mobile Communication (GSM).

The mapping server 106 may access mapping data from a map database 110 or other data storage device or system and provide the mapping data to the user devices 102 via the communication network 108. In other examples, the user device 102 may store the mapping data locally, thereby possibly rendering the communication network 108, the mapping server 106, and/or the map database 110 superfluous in some embodiments. The mapping data can include data about the point-of-interests (POIs) and their respective locations in the POI records. The mapping data may also include cartographic data, routing data, and/or maneuvering data. Such place or feature data can be part of the POI data or can be associated with POIs or POI data records (such as a data point used for displaying or representing a position in a venue). In addition, the mapping data may include event data, e.g., live events, scheduled events, unscheduled events, maintenance activities, etc., associated with the POI data records or other records of the map database 110 for the venue.

In the present examples, the mapping data may include venue map data, such as floor maps for each floor of one or more buildings or other public and non-public venues, including, but not limited to, office buildings, apartment buildings, shopping malls, hospitals, hotels, sports venues (e.g., stadiums, arenas, and so on), private residences, and the like. The mapping data may further include information about one or more floor connectors in each floor of the venue. The floor connectors as referred herein are structures that connect one floor to one or more other floors in the venue. The floor connectors may include elevators, escalators, stairs, ramps, and the like. The information about the floor connectors may include type of floor connector, the connections provided by the floor connector, size, shape and geometry of the floor connectors, etc. In some examples, the mapping data may also include information associated with various features of each of the floor, such as, for example, information associated with various organizations (e.g., corporate groups, touring groups, fraternal associations, and so on), information regarding individuals (e.g., name, contact information, organizational information, personal preferences, and so forth), and/or any other information possibly corresponding to the floor maps. The mapping data may also include information about external areas surrounding the one or more buildings in the venue, e.g., geographical features, street and building locations and names, and the like.

FIG. 2 illustrates a block diagram of the user device 102 for presenting and displaying the map of the venue to a user thereof. The user device 102 may include a user input interface 202, a display interface 204, a communication network interface 206, and a presentation module 208. The user device 102 may further include other modules or components (not shown in FIG. 2), such as, for example, one or more hardware processors, a power supply, and the like, which are not explicitly shown to focus and simplify the following discussion. Also, each of the modules 202-208 of the user device 102 may be implemented in hardware, software, or some combination thereof. In some examples, any of the modules 202-208 may be combined with other modules, or may be separated into a greater number of modules without any limitations.

The user input interface 202 may be configured to receive user input indications and user selections for directing the user device 102 to perform the various operations and functions discussed in the subsequent paragraphs. Examples of the user input interface 202 may include, for example, a touchscreen, a keyboard, a mouse, a joystick, and/or the like. In at least some embodiments, a user of the user device 102 may employ the user input interface 202 to select one of a plurality of displayed floor maps, select one or more graphical representations in a particular floor map, and so on.

The display interface 204 may be configured to present floor maps and other visual information to a display unit (such as, the display unit 104 of FIG. 1) for display to a user of the user device 102. The display interface 204 may include one or more of a composite video interface, a component video interface, a High Definition Multimedia Interface (HDMI), and/or any other digital or analog video interface, including external and/or internal video interfaces, possibly depending on whether the display unit 104 is incorporated within the user device 102.

The communication network interface 206 may be configured to communicate with a mapping server (such as, the mapping server 106 of FIG. 1) and other servers and communication devices via a communication network (such as, the communication network 108 of FIG. 1). The communication network interface 206 may be configured to communicate by way of a LAN, WAN, 3 G, or 4G network, or any other communication network or connection (as discussed above).

The presentation module 208 may be configured to present, at any one instant of time, map for at least one floor of multiple floors of the venue on a display unit (such as, the display unit 104 of FIG. 1) via the display interface 204. The presentation module 208 may also present for display various floor connectors in the at least one floor of the venue. The presentation module 208 may further present for display, in some examples, maps for geographic areas external to the buildings, information regarding features associated with such maps, and so forth. In some examples, the presentation module 208 may also generate the floor maps and other graphical information based on map data for the buildings, the environment surrounding the building, and/or other information. The maps being displayed may be controlled by the user based on input received via the user input interface 202.

The system 100 further includes at least one processor and at least one non-transitory memory including computer program code instructions. In some examples, the processor and the non-transitory memory may be implemented in the user device 102. In other examples, the processor and the non-transitory memory may be implemented outside of the user device 102 in a central server (such as, the mapping server 106 of FIG. 1) in conjunction with the user device 102. The processor may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally, or alternatively, the processor may include one or more processors configured in tandem via the bus to enable independent execution of instructions, pipelining and/or multithreading. The memory may be non-transitory and may include, for example, one or more volatile and/or non-volatile memories. In other words, for example, the memory may be an electronic storage device (for example, a computer readable storage medium) comprising gates configured to store data (for example, bits) that may be retrievable by a machine (for example, a computing device like the processor). The memory may be configured to store information, data, content, applications, instructions, or the like, for enabling the apparatus to carry out various functions in accordance with an example embodiment of the present invention. For example, the memory could be configured to buffer input data for processing by the processor. Additionally, or alternatively, the memory could be configured to store instructions for execution by the processor.

The processor (and/or co-processors or any other processing circuitry assisting or otherwise associated with the processor) may be in communication with the memory via a bus for passing information among components of the system 100. The processor may be configured to execute instructions stored in the memory or otherwise accessible to the processor. Additionally, or alternatively, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the system 100.

In the system 100, the computer program code instructions configured to, when executed, cause the at least one processor to perform steps of a method 300 depicted in the form of a flow chart in FIG. 3. The method 300 is a computer-implemented method for displaying a map of a floor in a multi-floor venue for a user. As noted earlier, the venue may include office buildings, apartment buildings, shopping malls, hospitals, hotels, sports venues (e.g., stadiums, arenas, and so on), private residences, and the like. Such venues usually have multiple floors which are connected by one or more floor connectors located in each floor of the venue. The floor connectors may include elevators, escalators, stairs, ramps, and the like. Different types of floor connectors may be designed and utilized to provide different types of connectivity between various floors in the venue.

At step 302, the method 300 includes generating a first view of at least one floor of the venue, as shown in FIG. 4. The first view includes a map (represented by the numeral 400) of at least one floor of the venue. It may be understood that the layout shown in the map 400 of FIG. 4 is exemplary only and shall not be construed as limiting to the present disclosure in any manner. As illustrated in FIG. 4, the floor may include multiple stores represented as blocks 400a, 400b and 400c in the map 400 for the sake of illustration. It may be understood that the map 400 may include more details about various elements in the floor without any limitations. In general, the at least one floor (as depicted in the map 400) is one of the floors in the venue where the user is currently located for to aid the user with navigation therein. The at least one floor may be automatically determined by using one or more sensors in the user device, such as, but not limited to, proximity sensors, triangulation devices, Bluetooth beacons, etc. In other examples, the first view further includes a level switch (not shown in FIG. 4) listing the various floors in the venue in order to allow the user to select the at least one floor (which may be the desired floor for which the user may wish to obtain the floor map) via the display unit 104 in the user device 102.

In the present embodiments, the map 400 includes one or more cartographic elements 402, such as the cartographic elements 402a and 402b representing positions of one or more floor connectors in the at least one floor. As noted earlier, each of the one or more floor connectors connects the at least one floor to one or more other floors in the venue. The cartographic elements 402 are displayed in the form of icons in the map 400. In some embodiments, the cartographic elements 402 may utilize different icons for different types of floor connectors. In the illustration of FIG. 4, the cartographic element 402a represents an escalator as the floor connector and the cartographic element 402b represents an elevator as the floor connector in the at least one floor of the present example.

In an embodiment, as illustrated in FIG. 4, the first view of the map 400 further includes one or more direction arrows 404 arranged next to each of the one or more cartographic elements 402. The one or more direction arrows 404 indicate relative positions of the one or more other floors connected via the one or more floor connectors corresponding to each of the one or more cartographic elements 402 with respect to the at least one floor. For instance, in FIG. 4, the cartographic element 402a have one direction arrow 404a pointing upwards, indicating that the floor connector represented by the cartographic element 402a can be utilized to move to one or more floors above the at least one floor (as shown in the map 400 of FIG. 4). Similarly, the cartographic element 402b have direction arrows 404b pointing both upwards and downwards, indicating that the floor connector represented by the cartographic element 402b can be used to move to upper floors as well as to lower floors with respect to the at least one floor (as shown in the map 400 of FIG. 4).

At step 304, the method 300 includes causing display of the first view (as shown in FIG. 4) on a display unit (such as, the display unit 104) of a user device (such as, the user device 102). For this purpose, the display interface 204 may present the map 400 and other visual information, including the cartographic elements 402, to the display unit 104 for display to the user of the user device 102. It may be contemplated by a person skilled in the art that the display interface 204 may render the map 400 on the display unit 104 of the user device 102 using known techniques in the art.

At step 306, the method 300 includes receiving, during the display of the first view, a user selection of one of the one or more cartographic elements 402 via the display unit (such as, the display unit 104). For example, as illustrated in FIG. 5, the user selection (represented by the numeral 502) may include selecting the cartographic element 402a and/or 404a in the first view of the map 400. Herein, the user selection 502 is represented in the form of a circle around the selected element in the map 400. It may be contemplated that for the user device 102 being a smartphone with the display unit 104 being a touchscreen display, the user selection 502 is achieved by tapping on the display unit 104 in the area showing the desired element to be selected. In other examples, the user selection 502 may be achieved by physical buttons like joystick, keyboard, etc. without affecting the scope of the present disclosure.

At step 308, the method 300 includes generating, in response to receiving the user selection 502, a second view (as illustrated in FIG. 6). The second view includes at least one graphic element 602 to indicate one or more possible directions of movement via the floor connector corresponding to the user selection 502 of the cartographic element 402a, from the at least one floor to the one or more other floors in the venue. In some embodiments, the graphic elements (such as, the graphic element 602) may have different shapes based, at least in part, on the corresponding cartographic elements (such as, the cartographic element 402a). In the illustrated example of FIG. 6, the cartographic element 402a being an escalator which provides a path for movement, the graphic element 602 depicts the path to be traversed by the user for reaching the one or more other floors from the at least one floor via the floor connector of the cartographic element 402a corresponding to the graphic element 602. In some examples, the graphic element 602 further provides guiding arrows overlaid on the depicted path to indicate direction of movement to be followed for reaching the one or more other floors from the at least one floor via the floor connector corresponding to the graphic element 602.

In an embodiment, the second view further comprises a numeral element 606 (as illustrated in FIG. 6) arranged next to the graphic element 602. The numeral element 606 indicates a relative level of the other floor, connected via the floor connector corresponding to the graphic element 602, with respect to the at least one floor shown in the map 400. For instance, in the exemplary configuration of FIG. 6, the graphic element 602 (representing an escalator of the cartographic element 402a) provides access to one floor above the at least one floor of the map 400. Thus, in the illustration of FIG. 6, the numeral element 606 is shown to be "+1" to indicate access to one floor above the at least one floor.

At step 310, the method 300 includes causing display of the second view (as shown in FIG. 6) on a display unit (such as, the display unit 104) of a user device (such as, the user device 102). For this purpose, the display interface 204 may present the map 400 and other visual information, including the cartographic elements 402, the graphic element 602 and the numeral element 604, to the display unit 104 for display to the user of the user device 102. It may be contemplated by a person skilled in the art that the display interface 204 may render the map 400 on the display unit 104 of the user device 102 using known techniques in the art. In an embodiment, the method 300 further includes causing display of a transition effect, in the form of an animation, while causing switching of the display from the first view to the second view on the display unit 104 of the user device 102. In one example, the transition effect may be such that the directional arrows 404 may be morphed into guiding arrows 604 during switching of the display from the first view to the second view.

In an embodiment, as illustrated in FIG. 7, the method 300 may further include receiving a user selection 702 of the numeral element 606 on the display unit 104 in the second view of the map 400. Herein, the user selection 702 is represented in the form of a circle around the selected numeral element 606 in the map 400. Further, the method 300 includes generating, in response to the user selection 702 of the numeral element 606, a third view. The third view includes a map 800 (as illustrated in FIG. 8) of the other floor connected to the at least one floor (as depicted in the map 400) via the floor connector corresponding to the numeral element 606 (specifically, the cartographic element 402a). As may be seen in the third view, the cartographic element 802a now includes a direction arrow 804a pointing downwards, indicating that the floor connector represented by the cartographic element 802a can be utilized to move to one or more floors below the at least one floor (as shown in the map 900 of FIG. 9). Further the method 300 includes causing display of the third view, including the map 800 with various elements such as the stores (represented by blocks 800a and 800b) in the said other floor and the floor connectors (represented by the cartographic elements 802) therein, on a display unit (such as, the display unit 104) of a user device (such as, the user device 102). Further, as illustrated in FIG. 9, it may be understood based on above discussions that upon user selection of the cartographic element 802a in the third view, a graphic element 902 may be displayed in the third view. The graphic element 902 may be overlaid with directional arrows 904 (which are generally opposite to directional arrows 604). Further, the third view may include a numeral element 906 which in this case may show "−1" to indicate access to one floor (i.e. the at least one floor) below the said other floor. It may be understood that upon user selection of the numeral element 906, the user device 102 is caused to display back the map 400 of the said at least one floor on the display unit 104.

As noted earlier, the cartographic elements implement different icons for different types of floor connectors. Further, the graphic elements have different shapes based, at least in part, on the corresponding cartographic elements. For example, FIG. 10 depicts a map 1000 of a floor in the venue (e.g. for a basement in the venue) with a cartographic element 1002 representing a ramp as the floor connector. In case of user selection 1102 of the cartographic element 1002 (as shown in FIG. 11) or the arrow thereof, a second view (as depicted in FIG. 12) may be generated and displayed on the display unit 104 of the user device 102. The said second view may include a graphic element 1202 (as shown in FIG. 12) which depicts a path to be traversed by the user for reaching one floor above. In one or more examples, the graphic element 1202 may be supplemented with direction arrows and the like. Further, a numeral element 1204 is provided which indicates a relative level of the other floor, connected via the floor connector corresponding to the graphic element 1202, with respect to the at least one floor shown in the map 1000. For instance, in the exemplary configuration of FIG. 12, the graphic element 1202 (representing a ramp) provides access to one floor above the at least one floor of the map 1000. Thus, in the illustration of FIG. 12, the numeral element 1204 is shown to be "+1" to indicate access to one floor above the at least one floor, i.e. the basement. Further, on user selection of the numeral element 1204, a map of the above floor may be generated and displayed (not shown). Herein, the floor connector corresponding to the cartographic element 1002 being a ramp, the corresponding path may be a curved path (as shown in FIG. 12).

FIG. 13 illustrates a map 1300 of at least one floor in the venue including various elements such as the stores (represented by blocks 1300a, 1300b and 1300c) and an elevator as a floor connector (represented by the cartographic element 1302) therein, as depicted in a first view. In case of user selection 1402 (as shown in FIG. 14), a second view (as depicted in FIG. 15) may be generated and displayed on the display unit 104 of the user device 102. The said second view may include a graphic element 1502 (as shown in FIG. 15) which is in the form of a bar listing the one or more other floors connected to the at least one floor (depicted in the map 1300) via the floor connector corresponding to the graphic element 1502. Herein, the floor connector corresponding to the cartographic element 1302 being the elevator, the graphic element 1502 includes a list of numeral elements 1504 indicating the various other floors being connected to the at least one floor (depicted in the map 1300) via the floor connector corresponding to the cartographic element 1302. Further, the highlighted numeral element from the list of numeral elements 1504 indicates level of the said at least one floor.

FIGS. 16-18 illustrate different techniques for representation of maps for first view and second view on the display unit 104 of the user device 102. Further, FIGS. 16-18 illustrate different techniques for representation of graphic elements in the second view on the display unit 104 of the user device 102. For instance, FIG. 16 illustrates a second view of a map 1600 of one of the floors of the venue with a cartographic element 1602 and corresponding graphic element 1604. As illustrated in FIG. 16, the graphic element 1604 have a trapezoidal shape (instead of rectangular shape as depicted earlier) with width increasing towards the direction of movement along the corresponding floor connector. FIG. 17 illustrates a first view with a map 1700 of one of the floors of the venue. Herein, the map 1700 is shown in a 2.5 dimensional plane (instead of 2 dimensional planes as depicted earlier). Further, in FIG. 18, the graphic element 1802 in the second view of the map 1700 is shown in a 2.5 dimensional plane for better guiding the user and aid the user to generate a mental model of the 3 dimensional space of the floor in the venue.

In an embodiment, the method 300 may further include restoring back to the first view from the second view upon receiving, during the display of the second view, a user interaction on the display unit. That is, if the user may tap (in case of the display unit 104 being a touchscreen display) on the display unit 104 on any area other than the ones showing the said elements during the display of the second view showing the graphic element and/or the numeral element, then the first view without the graphic element and/or the numeral element may be restored back from the second view. In another embodiment, the method 300 may further include restoring back to the first view from the second view after expiry of a predetermined period of time. In such embodiment, the predetermined period of time may be few seconds, for example 10 seconds, during which if the second view of the map of the floor is being displayed, then after completion of the said period, the first view of the map of the floor is restored.

It may be understood that the method, system and computer program product of the present disclosure may be implemented to help the user to navigate through the venue to reach a final destination thereof. For instance, the system 100 may guide the user from, say, a parking facility in a basement of the venue to a final destination in a top floor of the venue using various floor connectors. The present disclosure helps to expose the existing map data with additional functionality by providing visual details about the floor connectors in the venue. The graphic elements representing the floor connectors are expanded only when needed, thus reducing the clutter in the display unit 104 which is usually a small screen display and thus making space to display more details about other elements like stores in that floor of the venue. The views generated by the systems and methods of the present disclosure results in no overlapping map elements in general map display. Further, the level switch is integrated into the map, and not shown as a separate element, thus providing further space to display other elements. Further, the user gets required information about connected floors from each floor connector, and thus gain better understanding of the connected floors in the indoor environment. The method, system and computer program product of the present disclosure leverage dynamic information and sensors installed in the user device itself, and does not particularly warrant or require additional infrastructure to be installed in the venue for achieving the said purpose.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A computer-implemented method for displaying a map to guide a user in a venue for a user, the method comprising:
generating a first view, the first view comprising a map of at least one floor of the venue with one or more cartographic elements representing positions of one or more floor connectors in the at least one floor relative to other features of the at least one floor, wherein each of the one or more floor connectors connects the at least one floor to one or more other floors in the venue, and wherein the first view further comprises one or more direction arrows associated with respective cartographic elements, the one or more direction arrows indicating positions of the one or more other floors, connected via the one or more floor connectors corresponding to the respective cartographic elements, with respect to the at least one floor;

causing display of the first view on a display unit of a user device;

receiving, during the display of the first view comprising the map of the at least one floor of the venue with the one or more cartographic elements, a user selection of one of the one or more cartographic elements representing positions of one or more floor connectors in the at least one floor via the display unit, and wherein receiving the user selection of one of the one or more cartographic elements comprises receiving user selection of the direction arrow associated with the cartographic element to be selected;

in response to receiving the user selection during display of the first view, generating a second view, the second view comprising at least one graphic element, different than but based at least in part on the one or more cartographic elements, to indicate a direction of movement via the floor connector corresponding to the user selection of the cartographic element, from the at least one floor to the one or more other floors in the venue, wherein the graphic element depicts a path to be traversed by the user for navigating the user to the one or more other floors from the at least one floor via the floor connector corresponding to the graphic element; and causing display of the second view on the display unit of the user device, wherein causing the display of the second view comprises: (i) causing display of a transition effect in the form of an animation while switching the display from the first view to the second view or (ii) causing display of at least a portion of the second view in a 2.5 dimensional plane.

2. The method of claim 1, wherein the second view further comprises a numeral element arranged next to the graphic element, the numeral element indicating a relative level of the other floor, connected via the floor connector corresponding to the graphic element, with respect to the at least one floor.

3. The method of claim 2 further comprising:
receiving a user selection of the numeral element on the display unit;
generating, in response to the user selection of the numeral element, a third view, the third view comprising a map of the other floor connected to the at least one floor via the floor connector corresponding to the numeral element; and
causing display of the third view on the display unit of the user device.

4. The method of claim 1, wherein the graphic element includes guiding arrows overlaid on the depicted path to indicate direction of movement to be followed for navigating to the one or more other floors from the at least one floor via the floor connector corresponding to the graphic element.

5. The method of claim 1, wherein the graphic element is in the form of a bar listing the one or more other floors connected to the at least one floor via the floor connector corresponding to the graphic element.

6. The method of claim 1, wherein the at least one floor is one of the floors in the venue where the user is currently located, and wherein the at least one floor is automatically determined by using one or more sensors in the user device.

7. The method of claim 1, wherein the cartographic elements implement different icons for different types of floor connectors.

8. The method of claim 7, wherein the graphic elements have different shapes based, at least in part, on the corresponding cartographic elements.

9. The method of claim 1 further comprising restoring back to the first view from the second view upon receiving, during the display of the second view, a user interaction on the display unit.

10. The method of claim 1 further comprising restoring back to the first view from the second view after expiry of a predetermined period of time.

11. A system for displaying a map to guide a user in a venue, the system comprising:
a user device with a display unit, wherein the display unit is configured to receive a user selection;
at least one processor; and
at least one non-transitory memory comprising computer program code instructions, the computer program code instructions configured to, when executed, cause the at least one processor to:
generate a first view, the first view comprising a map of at least one floor of the venue with one or more cartographic elements representing positions of one or more floor connectors in the at least one floor relative to other features of the at least one floor, wherein each of the one or more floor connectors connects the at least one floor to one or more other floors in the venue, and wherein the first view further comprises one or more direction arrows associated with respective cartographic elements, the one or more direction arrows indicating positions of the one or more other floors, connected via the one or more floor connectors corresponding to the respective cartographic elements, with respect to the at least one floor;
cause display of the first view on the display unit of the user device;
receive, during the display of the first view comprising the map of the at least one floor of the venue with the one or more cartographic elements, a user selection of one of the one or more cartographic elements representing positions of one or more floor connectors in the at least one floor via the display unit, and wherein receiving the user selection of one of the one or more cartographic elements comprises receiving user selection of the direction arrow associated with the cartographic element to be selected;
in response to receiving the user selection during display of the first view, generate a second view, the second view comprising at least one graphic element, different than but based at least in part on the one or more cartographic elements, to indicate a direction of movement via the floor connector corresponding to the user selection of the cartographic element, from the at least one floor to the one or more other floors in the venue, wherein the graphic element depicts a path to be traversed by the user for navigating the user to the one or more other floors from the at least one floor via the floor connector corresponding to the graphic element; and
cause display of the second view on the display unit of the user device, wherein causing the display of the second view comprises: (i) causing display of a transition effect in the form of an animation while switching the display from the first view to the second view or (ii)

causing display of at least a portion of the second view in a 2.5 dimensional plane.

12. The system of claim 11, wherein the second view further comprises a numeral element arranged next to the graphic element, the numeral element indicating a relative level of the other floor, connected via the floor connector corresponding to the graphic element, with respect to the at least one floor.

13. The system of claim 12, wherein the computer program code instructions further cause the at least one processor to:
   receive a user selection of the numeral element on the display unit;
   generate, in response to the user selection of the numeral element, a third view, the third view comprising a map of the other floor connected to the at least one floor via the floor connector corresponding to the numeral element; and
   cause display of the third view on the display unit of the user device.

14. The system of claim 11, wherein the user device comprises one or more sensors to determine the floor in the venue where the user is currently located, and wherein the computer program code instructions further cause the at least one processor to register the at least one floor to be the floor in the venue where the user is currently located.

15. A computer program product comprising at least one non-transitory computer-readable storage medium having computer-executable program code instructions stored therein, the computer-executable program code instructions comprising program code instructions to:
   generate a first view, the first view comprising a map of at least one floor of the venue with one or more cartographic elements representing positions of one or more floor connectors in the at least one floor relative to other features of the at least one floor, wherein each of the one or more floor connectors connects the at least one floor to one or more other floors in the venue;
   cause display of the first view on a display unit of a user device;
   receive, during the display of the first view comprising the map of the at least one floor of the venue with the one or more cartographic elements, a user selection of one of the one or more cartographic elements representing positions of one or more floor connectors in the at least one floor via the display unit;
   in response to receiving the user selection during display of the first view, generate a second view, the second view comprising at least one graphic element, different than but based at least in part on the one or more cartographic elements, to indicate a direction of movement via the floor connector corresponding to the user selection of the cartographic element, from the at least one floor to the one or more other floors in the venue, wherein the graphic element depicts a path to be traversed by the user for navigating the user to the one or more other floors from the at least one floor via the floor connector corresponding to the graphic element, and wherein the second view further comprises a numeral element associated with and proximate to the graphic element that is indicative of the direction of movement of the floor connector, the numeral element indicating a relative level of the other floor, connected via the floor connector corresponding to the graphic element, with respect to the at least one floor;
   cause display of the second view on the display unit of the user device, wherein causing the display of the second view comprises: (i) causing display of a transition effect in the form of an animation while switching the display from the first view to the second view or (ii) causing display of at least a portion of the second view in a 2.5 dimensional plane;
   receive a user selection of the numeral element;
   generate, in response to the user selection of the numeral element, a third view, the third view comprising a map of the other floor connected to the at least one floor via the floor connector corresponding to the numeral element; and
   cause display of the third view on the display unit of the user device.

16. The computer program product of claim 15, wherein the first view further comprises one or more direction arrows arranged next to each of the one or more cartographic elements, the one or more direction arrows indicating positions of the one or more other floors, connected via the one or more floor connectors corresponding to each of the one or more cartographic elements, with respect to the at least one floor, and wherein the program code instructions to receive the user selection of one of the one or more cartographic elements comprise program code instructions to receive user selection of the direction arrow arranged next to the cartographic element to be selected.

* * * * *